United States Patent [19]
Gustafson et al.

[11] Patent Number: 5,473,488
[45] Date of Patent: Dec. 5, 1995

[54] STATIC ATTITUDE ADJUSTMENT VIA A SOLIDIFIED DROP FOR A MAGNETIC HEAD SUSPENSION

[75] Inventors: Gary E. Gustafson, Darwin; Brent D. Lien, Minneapolis, both of Minn.

[73] Assignee: Hutchinson Technology Incorporated, Hutchinson, Minn.

[21] Appl. No.: 285,223

[22] Filed: Aug. 3, 1994

[51] Int. Cl.$^6$ .............................. G11B 5/49; G11B 21/16
[52] U.S. Cl. ............................................ 360/104; 360/103
[58] Field of Search ................................... 360/103–106, 360/125, 126

[56] References Cited

U.S. PATENT DOCUMENTS

| | | | |
|---|---|---|---|
| 4,309,732 | 1/1982 | Kronfeld et al. | 360/104 |
| 4,328,521 | 5/1982 | Pexton et al. | 360/104 |
| 4,764,830 | 8/1988 | Kobayashi et al. | 360/104 |
| 4,991,045 | 2/1991 | Oberg | 360/104 |
| 5,019,931 | 5/1991 | Ohwe et al. | 360/104 |
| 5,079,660 | 1/1992 | Yumura et al. | 360/104 |
| 5,124,865 | 6/1992 | Atesmen et al. | 360/103 |
| 5,282,103 | 1/1994 | Hatch et al. | 360/104 |
| 5,331,489 | 7/1994 | Johnson et al. | 360/104 |

FOREIGN PATENT DOCUMENTS

| | | | |
|---|---|---|---|
| 93309023 | 11/1993 | European Pat. Off. | |
| 62-65275 | 3/1987 | Japan . | |
| 63-90084 | 4/1988 | Japan . | |
| 63-225981 | 9/1988 | Japan | 360/104 |
| 1-92975 | 4/1989 | Japan | 360/104 |
| 2-19867 | 3/1990 | Japan . | |
| 3-16069 | 1/1991 | Japan . | |

Primary Examiner—Stuart S. Levy
Assistant Examiner—Jefferson Evans
Attorney, Agent, or Firm—Faegre & Benson

[57] ABSTRACT

A head suspension assembly for positioning a head assembly at the correct static attitude with respect to the surface of a rotatable data storage device. The head assembly includes a gimbal assembly having a novel static attitude adjustment feature comprising a solid drop of material. The solid drop of material is dispensed as a fluid on the desired location and then cured to solid form. The solidified drop of material can be used to create surface features on head suspension assemblies for correcting pitch and roll static attitude errors and for applying gram loads on the head assembly.

22 Claims, 10 Drawing Sheets

STATIC ATTITUDE ADJUSTMENT VIA A SOLIDIFIED DROP FOR A MAGNETIC HEAD SUSPENSION

BACKGROUND OF THE INVENTION

Head suspension assemblies (HSAs) include, as component elements, a base plate, a load beam, a gimbal flexure and a head assembly. The load beam is an elongated metal spring structure. The base plate is attached to a proximal end of the load beam, and can be configured for mounting the load beam to an actuator arm of a disk drive. The gimbal flexure is positioned on a distal end of the load beam. Mounted to the gimbal flexure is a head assembly, which is thereby supported in read/write orientation with respect to an associated disk. The head assembly comprises a read/write transducer attached to an air bearing structure called a slider.

HSAs suspend the "flying" head assembly nanometers away from the surface of a rotatable data storage device (a spinning disk). The gimbal flexure provides gimballing support, that is, the gimbal flexure positions and maintains the head assembly at a desired flying attitude, a predetermined angle and height in relationship to the disk surface. The static attitude of the head assembly, the position of the head assembly at rest, is calibrated so that when the disk drive is in operation, and the slider is affected by the lifting force of the air stream caused by the rotation of the disk, the head assembly reaches an optimal dynamic attitude (position of the head assembly during operation).

To counter the air lift pressure exerted on the slider during disk drive operation, a predetermined load (a "gram load") is applied through a load point feature on the suspension assembly to a precise load point on the slider. The head flies above the disk at a height established by the equilibrium of the gram load on the load point and the lift force of the air stream. Load point positioning is critical to maintain the head at the desired flying angle. Also, since in a circular disk the outside surfaces have a greater surface speed than the inside surfaces, load point positioning compensates for the air speed differentials between the inside and outside edges of the slider.

A conventional gimbal flexure, sometimes referred to as a Watrous gimballing flexure design, is formed from a single sheet of material and includes a pair of outer flexible arms about a central aperture and a cross piece extending across and connecting the arms at a distal end of the flexure. A flexure tongue is joined to the cross piece and extends from the cross piece into the aperture. A free end of the tongue is centrally located between the flexible arms. The head assembly is mounted to the free end of the flexure tongue.

During attachment of the slider to the flexure tongue, the mounting surface datum (to which the load beam is mounted during HSA assembly) and the slider air bearing surface datum must be at a predetermined orientation with respect to each other (desired relationship). The mounting surface datum and the slider air bearing surface datum are level surfaces used as reference points or surfaces in establishing the desired relationship of the actuator mounting surface and the slider air bearing surface relative to each other (nominal angle). The upper and lower surfaces of the slider are manufactured according to specifications requiring them to be essentially or nominally parallel to each other.

During the process of manufacturing and assembling the HSA, any deviations caused by lack of precision in forming or assembling the individual elements contributes to a lack of planarity in the surfaces of the elements. A buildup of deviations from tolerance limits in the individual elements causes deviation from the desired relationship. The parameters of static roll and static pitch torque in the HSA result from these inherent manufacturing and assembly tolerance buildups. The load point feature of common gimbals does not compensate or help correct these tolerance deviations.

Static roll torque and static pitch torque have their rotational axes at about the center of the slider in perpendicular planar directions, and are caused by unequal forces acting to maintain the desired relationship on the slider while the head assembly is flying over the disk. That is, static torque is defined as a torque or a moment of force tending to cause rotation to a desired static (i.e., reference) attitude about a specific axis.

As applied to a HSA, the longitudinal axis of the slider is parallel and ussually coincident with the longitudinal axis of the load beam and of the HSA. The axis of roll torque is coincident with the longitudinal axis of the HSA. The value of static roll torque is measured on either surface of the static roll torque axis when the flexure tongue is parallel with the base plate. If the flexure has been twisted about the static roll torque axis during manufacture (i.e., there is planar non-parallelism of the flexure tongue with respect to the disk along the roll torque axis), the values measured on either surface of the roll torque axis will not be the same. Thus, when the attached slider is in flying attitude to the associated disk surface, force (referred to as an induced roll torque value) is needed to twist the tongue back into desired relationship alignment to the disk.

The axis of pitch torque is perpendicular to the longitudinal axis of the HSA. The value of static pitch torque is measured on either surface of the static pitch torque axis when the flexure tongue is parallel with the base plate. If the flexure has been twisted about the static pitch torque axis during manufacture (i.e., there is planar non-parallelism of the flexure tongue with respect to the disk along the pitch torque axis), the values measured on either surface of the pitch torque axis will not be the same. Thus, when the attached slider is in flying attitude to the associated disk surface, force (referred to as an induced pitch torque value) is needed to twist the tongue back into parallel alignment to the disk. It will of course be understood that in actual static and dynamic attitude conditions the flexure can be twisted with respect to both axes, requiring alignment about both the pitch axis and the roll axis.

These torques can also be referred to in terms of static attitude at the flexure/slider interface and in terms of the pitch and roll stiffness of the flexure. The ideal or desired pitch and roll torques are best defined as those which would exist if the components were installed in an ideal desired relationship configuration in a disk drive. In an actual disk drive, pitch and roll static torques produce adverse forces between the air bearing surface of the slider and the disk, affecting the flying height of the slider above the disk, resulting in deviations from optimum read/write transducer and head assembly/disk interface separation.

In the static attitude of a conventional flexure design, the flexure tongue is offset from the flexure toward the slider to allow gimballing clearance between the upper surface of the slider and the lower surface of the flexure. The offset is formed where the flexure tongue and cross piece join, in conjunction with the dimple that is formed on the flexure tongue. The standard flexure design evidences a low value of pitch stiffness and a moderate value of roll stiffness. Pitch stiffness and roll stiffness are each measured in (force× distance)/degree.

Thus, gimbal flexure designers desire to achieve a precise method of fabrication that accurately compensates and corrects for manufacturing variations that currently contribute to static pitch and roll torque errors. The manufacturing process should be efficient to perform corrections for static roll torque, as well as for static pitch torque, since the ability to correct for both static torques is needed for proper flexure/slider alignment. Ideally, the manufacturing process should also result in accurate and simple placement of the load point feature.

Formation of pressure-formed surface features, such as dimples or depressions, present accuracy difficulties. To increase manufacturing efficiency and ease of assembly, the number of additional components in a flexure, especially small, delicate components, is preferably reduced. Features and additional components should be cost-efficient, yet able to meet performance requirements. Only precise location of a load point feature allows precise location of the slider flying surface; as the load point shifts from nominal the slider has a tendency to not fly in the proper orientation relative to the disk due to the torque resulting from the off-center load force. Thus, the manufacturing process of the ideal gimbal flexure should use very accurate manufacturing techniques, be cost-effective, and reduce the number of unnecessary manufacturing steps and elements.

SUMMARY

The present invention is a gimbal assembly having surface features—static attitude correction features and load point features—formed by novel dome or cone-shaped drops of a solidified material, and a method of manufacture of such a gimbal assembly. The present method of manufacture allows precise placement of surface features which can be easily and efficiently integrated into most present gimbal designs.

The gimbal assembly of the present invention includes a planar flexure platform supported by spring arms. The flexure platform is a planar element and has a head-engaging first side and an opposite-facing second side. The platform includes a static attitude adjustment feature protruding perpendicularly away from a predetermined position on the first surface. Static attitude adjustment features allow placement of the head at a correct flying attitude, compensating for static pitch and roll manufacturing errors. The static attitude adjustment feature comprises a solidified drop of a suitable material. Suitable materials are those that are capable of being dispensed as a fluid that cures into a solid which remains in the solid phase throughout the standard range of disk drive operating temperatures and pressures. As fluids, suitable materials have the sufficient viscosity and surface tension, preferably at room temperature and pressure, to be dispensed in discreet minute drops and form a raised droplet with the desired Z-height profile. The desired Z-height profile varies depending on the expected magnitude of torque errors and on the required head clearance.

In other embodiments, a load point feature comprising a similar raised solid drop of material is placed on the second surface of the flexure platform or on a load cover. Load point features are structures that apply a desired gram load to a predetermined equilibrium load point on the head assembly. Guide features-posts, cavities, or domes—can be etched, stamped, or formed on the flexure platform or the load cover to control the placement of the original drop of fluid or to create supplementary surface features.

The method of manufacture for a gimbal assembly including a solid drop surface feature comprises a first step of manufacturing a gimbal assembly according to traditional methods. Guide features can be etched or formed on either surface of the flexure platform of the gimbal assembly to help place the original drop(s) of fluid. A drop of a suitable fluid is then placed on the surface of the flexure platform to create the static attitude adjustment feature or load point feature. The drops are placed at the predetermined positions using a hollow needle micro injector. The raised droplet is then cured into a solid by processes, such as low heat, UV radiation, or catalyst addition, that do not adversely affect the rest of the suspension assembly. When cured, the solid drop adheres to the first surface of the flexure platform and becomes the intersection of static roll torque axis adjustment and static pitch torque axis adjustment.

When mounting the head assembly to the gimbal, the solid drop serves as a pivot point on which the head assembly can prescribe an angular movement along both the pitch and roll axes to compensate for pitch and roll errors and to attain a desired flying attitude. A bonding adhesive is injected in the interstitial spaces between the first surface of the gimbal flexure platform and the bonding surface of the slider of the head assembly to hold the head assembly at the desired flying attitude. The solid drop prevents the bonding adhesive from being "squeezed-out" by the gram load pressure applied on the head assembly through the flexure platform. The solid drop can be electrically conductive to allow for electrostatic bleed-off of the head assembly through the suspension assembly.

The solidified drop surface features can be integrated easily into already existing gimbals or integrated into the manufacture of most current gimbal assembly designs without the need for new complex machinery or imprecise forming processes. Fabrication of solid drop surface features is extremely effective.

DETAILED DESCRIPTION OF THE INVENTION

The present invention is a novel gimbal assembly having precise and cost-efficient static attitude correction and load point features, and a method of manufacturing such a gimbal assembly.

Figure 1:
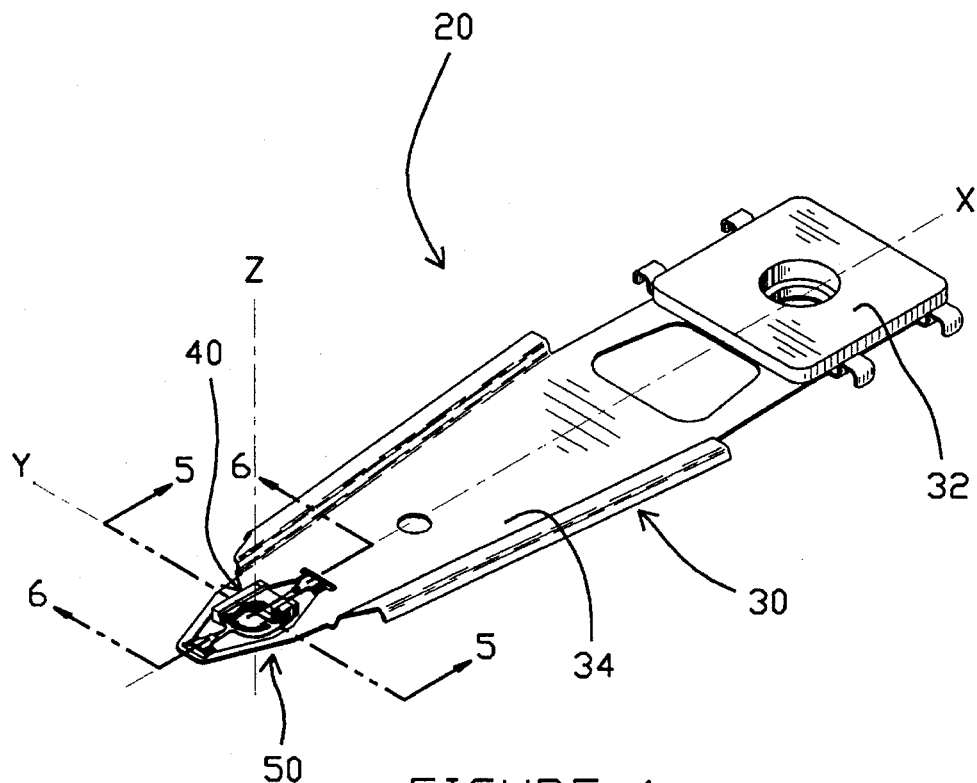
FIG. 1 is a perspective view of a first side of an embodiment of an assembled head suspension assembly including a gimbal assembly in accordance with the present invention and a cut-away view of the head assembly.

FIG. 1 shows a head suspension assembly (HSA) 20 in accordance with the present invention. The HSA 20 is a generally planar elongated structure that rests on a horizontal plane and is aligned with a longitudinal axis X and a lateral axis Y. HSA 20 includes a load beam 30, a head assembly 40 and a gimbal assembly 50. A base plate 32 is attached to a proximal end of a first side 34 of load beam 30. The gimbal assembly 50 is located at the distal end of the load beam 30 and provides gimballing support to the head assembly 40. The gimbal assembly 50 can be an integral element of the load beam 30, such as shown in the present embodiment, or a separate element attached to the load beam 30 by methods known in the art, such as the embodiment shown in FIG. 9. The gimbal assembly 50 and the load beam 30 together form a suspension assembly.

Figure 2:
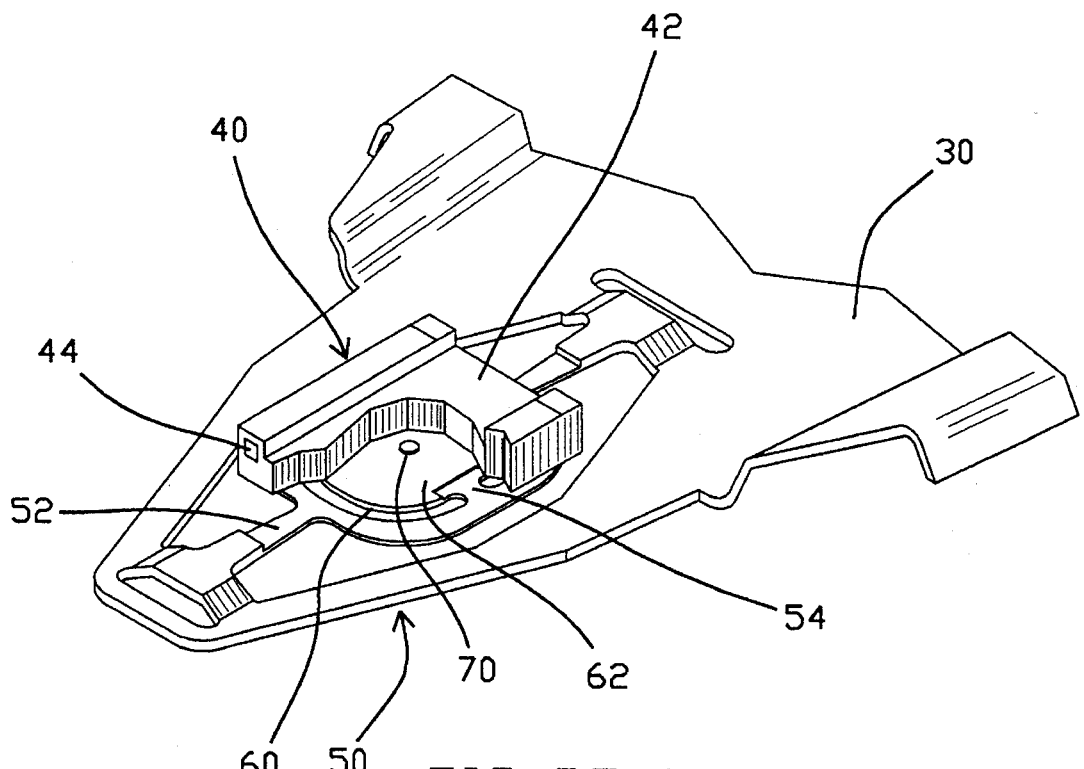
FIG. 2 is a detailed perspective view of the gimbal assembly and cut-away view of the head assembly of the head suspension assembly of FIG. 1.

A detailed view, shown in FIG. 2, better shows the details of head assembly 40 and gimbal assembly 50. The head assembly 40 includes an air bearing element called a slider 42, and a read/write transducer 44.

Gimbal assembly 50 includes a flexure platform 60. The flexure platform 60 is a planar thin metal element suspended over a void and supported by longitudinal spring arms 52 and lateral spring arms 54. The flexure platform 60 has a first (slider-engaging) surface 62 and a second (opposite) surface 64 (shown in FIG. 4). The spring arms 52 and 54 are offset (gimbal offset forming) along a Z-axis perpendicular to the X and Y axes to allow for head clearance during gimballing motion.

Figure 3A:
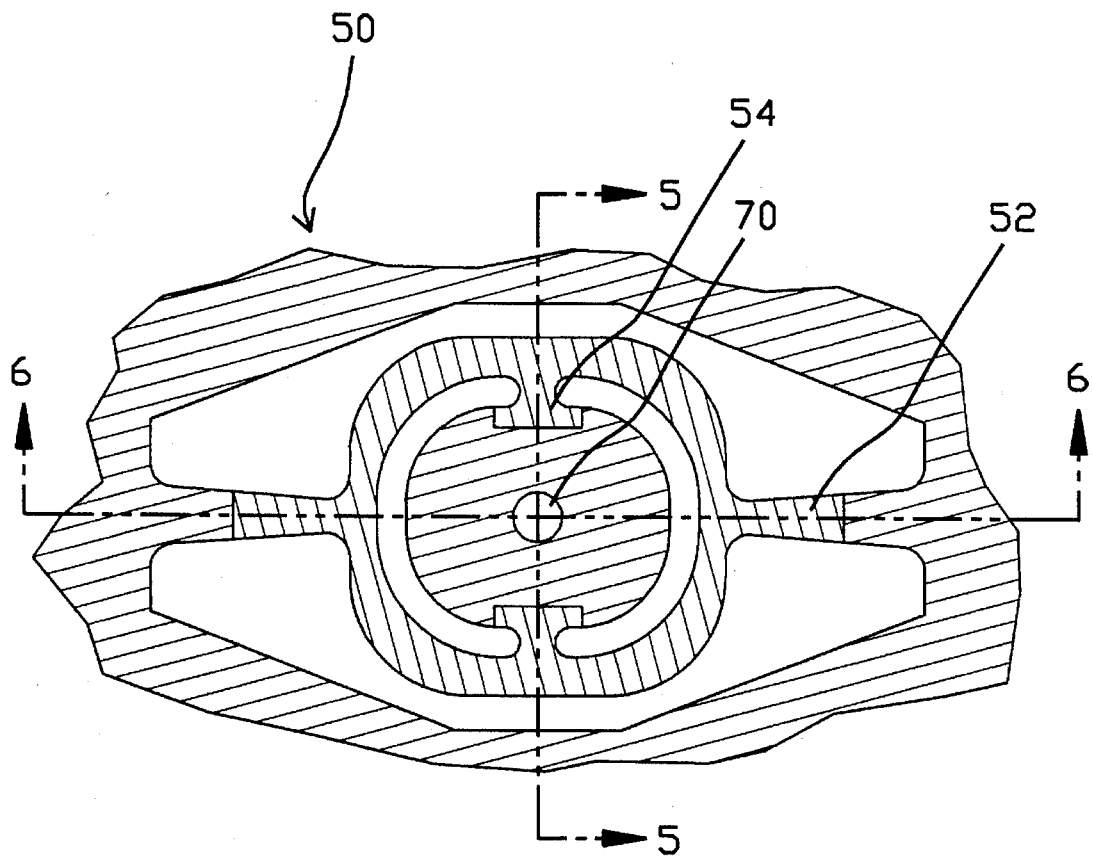
FIG. 3A is a plan view of the gimbal assembly of FIG. 1.

FIG. 3A is a plan view showing the placement of a static attitude adjustment feature 70 on the first surface 62 of the flexure platform 60. The static adjustment feature 70 is located at a predetermined location at the intersection of a gimbal roll axis (co-linear with the X-axis) and a pitch axis (co-linear with the Y-axis), in order to maximize clearance adjustment in all angles.

The static attitude adjustment feature 70 is a solid drop of a one component epoxy adhesive—Loctite® product 3609 or of another suitable material. Other suitable materials include Ablebond® 8503M, 9791AS, P1-8190 Conductive Materials, Loctite® 3609, 348, 3607, 368, 348, 3603, Ciba Epibond® 7275, Kester 9000, 9010, and Multi Core SMD Adhesives 881, 882. Loctite® has highly thixotropic and de-aerated properties that make Loctite® a suitable material for drop shape control and high speed surface mounting technology (SMT) dispensing equipment. Suitable materials can handle high speed dispensing and have high wet strength. When in the fluid phase, suitable materials do not slump or string when dispensed at high speeds (approximately four shots per second). The preferred thixotropic range is three to six.

Figure 3B:
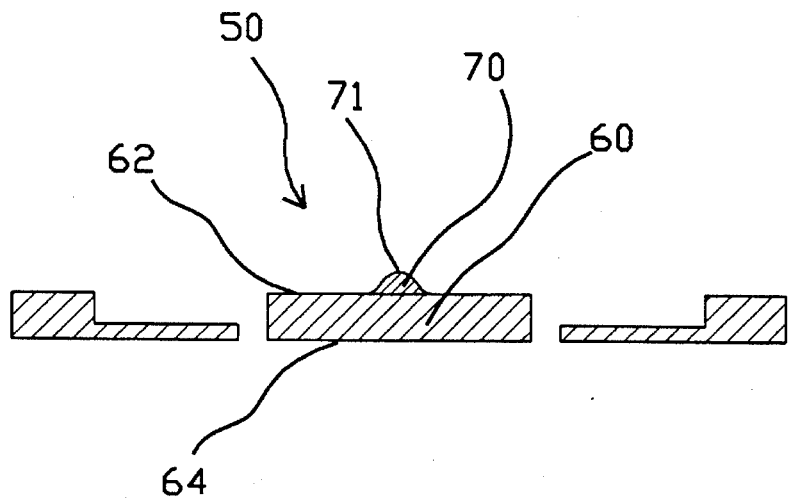
FIG. 3B is a side cross-sectional view along line 6—6 of the gimbal assembly of FIG. 1.

FIG. 3B is a cross-sectional view along line 6—6 of the gimbal assembly 50. The static attitude adjustment feature 70 is dome or cone-shaped and has a desired Z-height profile. A drop with a preferred Z-height profile has an unhindered central point apex 71 (that acts as a pivot point) and a Z-height that results in sufficient clearance to allow gimballing movement of the head assembly 40 and compensation of the expected pitch and roll torque errors. The higher the Z-height, the larger the pitch and roll angle of error that can be corrected using the static attitude adjustment feature 70. For example, on a nanoslider having a longitudinal measure of 2.0 mm, a static attitude adjustment feature having a height of 0.02 mm can accommodate one degree of error. A static attitude adjustment feature having a height of 0.045 mm to 0.05 mm clearance for gimballing allows corrections of approximately 2.6° to 2.9°. The necessary Z-height is equal to the sine of phi times half the length of the slider, where phi is the maximum desired correction angle (see FIG. 8).

The first step in the manufacture of the gimbal assembly 50 is to provide a flexure platform 60 supported by spring arms 52 and 54. The flexure platform 60 can be manufactured by methods known in the art such as etching, forming or stamping. The second step is to dispense a small fluid drop of a suitable material on a predetermined location on the first surface 62 of the flexure platform 60. The material is dispensed by hollow micro dispensing needles. Therefore, the fluid has a small solid particle size to ease flow. The material is packaged without air pockets to ensure accurate dispensing volume and avoid blank shots. The fluid material exhibits good green adhesive strength so the drop of fluid does not roll or fall off the flexure platform 60 prior to curing. The fluid has a sufficient surface tension coefficient to ensure the desired dot Z-profile.

Finally, once placed, the fluid is cured into a solid by exposure to heat. Other embodiments use materials that are cured by UV radiation, catalytic addition, or other methods that do not negatively affect other components. Loctite® 3609 cures in three to five minutes with a low minimum curing temperature of 100° C. In a production environment, consistent viscosity and thixotropic index is desired to achieve repeatable drop shape and height. Suitable materials have a high solid content and cure without shrinking, since shrinking can alter the shape of the drop. The fluid also has minimum leveling, slumping or migration during cure. A shape having an apex with sufficient clearance (e.g. a smooth spherical or conical shaped drop) is critical. An ideal material for the drop will be chemically inert, have no to low out gassing (which can contaminate the disk surface), and attract no dust or moisture, thus minimizing swelling.

In other embodiments (e.g. those using Ablebond® 8350M), the static attitude adjustment feature is electrically conductive in the solid phase to allow electrostatic bleed-off of the head assembly. In still other embodiments, the static attitude adjustment feature is electrically insulating to preserve signal clarity.

Still other embodiments (not shown) include solder static attitude adjustment features. In these embodiments, the intended location of the drop on the flexure platform is plated (with gold, nickel, silver, etc.). A volume of solder is then dispensed on the intended location. The solder wets on the spot and solidifies to form the desired raised surface features.

An alternative method of manufacture is to dispense the drop(s) of fluid into a receiving surface, such as a flat sheet coated with Teflon®, curing the drop(s) of fluid, and then adhesively attaching the drop(s) of fluid to the desired location(s) on the surface of the flexure platform or the load cover. The drop could also be injection molded and then attached.

Figure 3C:
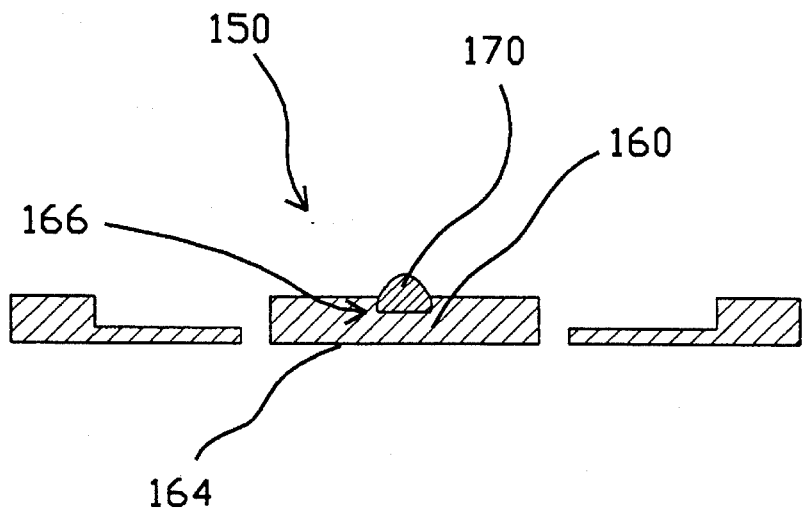
FIG. 3C is a side cross-sectional view, along a line situated in a similar position as line 6—6, of a second embodiment of a head suspension assembly similar to the head suspension assembly of FIG. 1,.
Figure 3D:
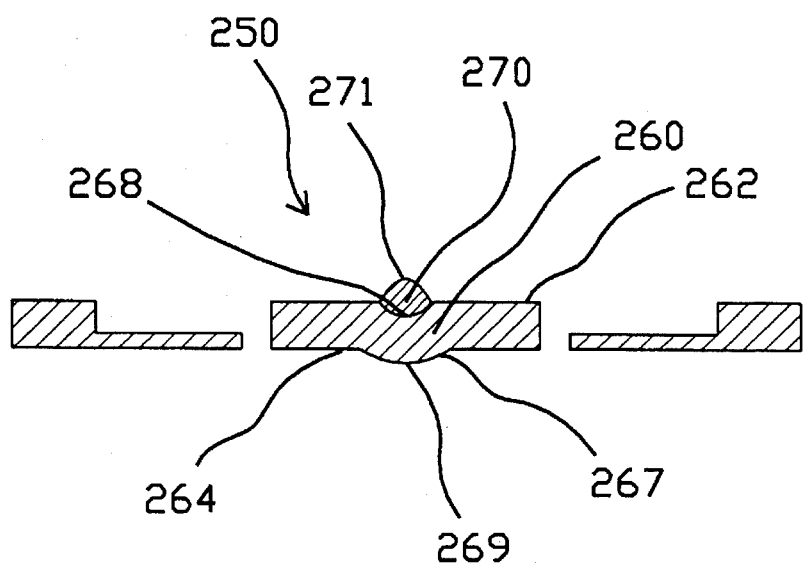
FIG. 3D is a side cross-sectional view, along a line situated in a similar position as line 6—6, of a third embodiment of a head suspension assembly similar to the head suspension assembly of FIG. 1.

FIG. 3C shows a gimbal assembly 150 having a flexure platform 160 including an etched cavity 166 positioned to receive a drop of adhesive 170. The HSA embodiments including the gimbal assembly 150, shown in FIG. 3C, and the gimbal assembly 250, shown in FIG. 3D, are similar to the HSA 20 shown in FIGS. 1, 2, and 4, with the exception of certain gimbal assembly features described below. Similar features in the different embodiments are identified in the drawings by the same last two digits. The addition of a digit in the hundreds position differentiates the different embodiments.

In gimbal assembly 150, the cavity 166 acts as a guide feature for defining and positioning the drop of adhesive 170. Other embodiments, (not shown) can include other guide features, such as a short stub (around which the surface tension of the fluid helps to hold the drop) or a channel. During the manufacturing process, guide features are etched, formed, stamped, or otherwise created on the surfaces of the flexure platform 160.

FIG. 3D shows another gimbal assembly 250 having a flexure platform 260 with a formed dome 267. Dome 267 has a convexity 269 protruding from a second surface 264 of the flexure platform 260 and a concave depression 268 on a first surface 262 of the flexure platform 260. The dome 267 is manufactured by applying a round punch press to the first surface 262 of the flexure platform 260. The concave cavity 268 serves to position and contain a drop of an adhesive fluid 270 having an apex 271.

Figure 4:
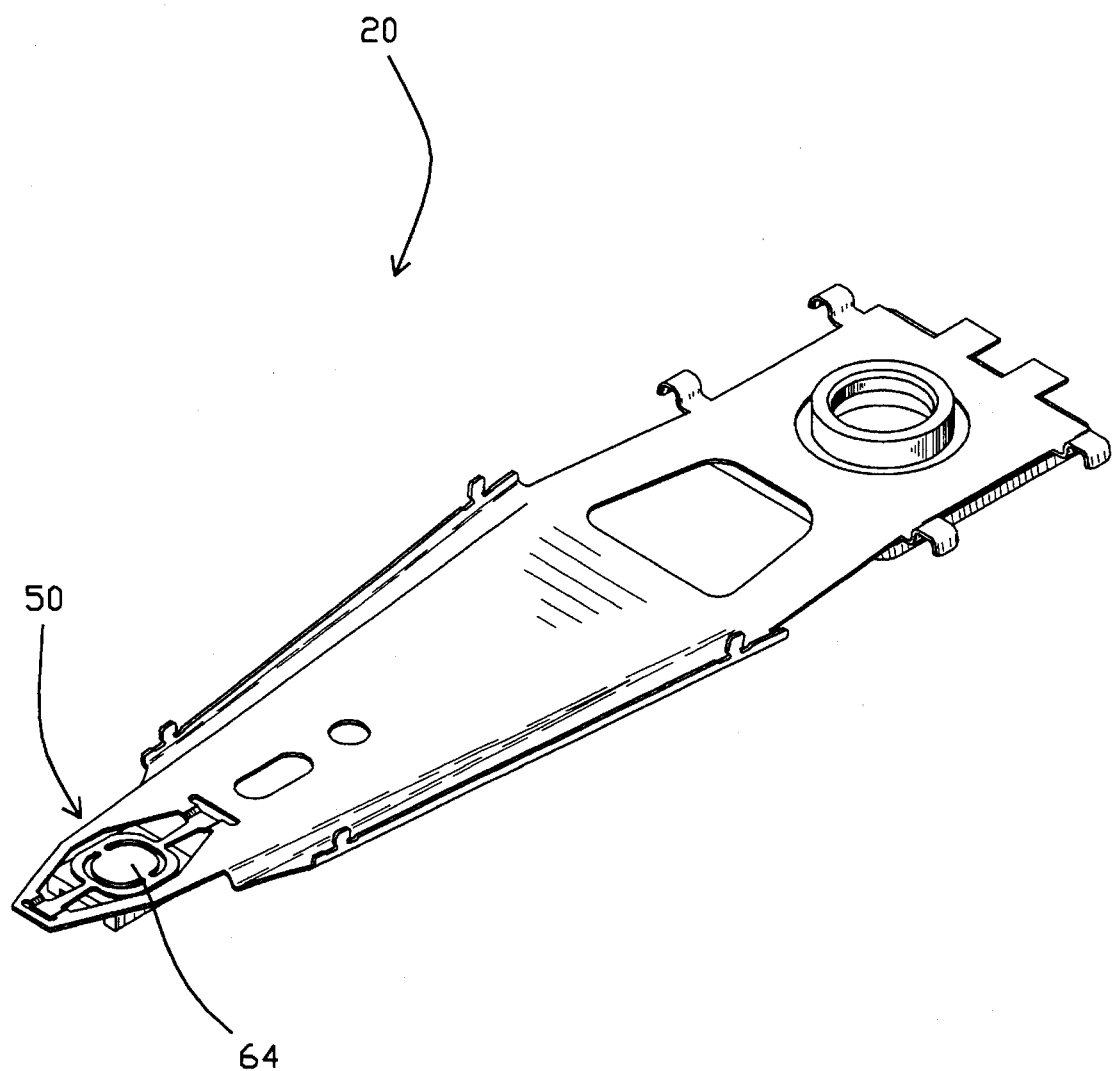
FIG. 4 is a perspective view of a second side of the head suspension assembly of FIG. 1.

FIG. 4 shows a second surface of the HSA 20 shown in FIG. 1. A second surface 64 of flexure platform 60 can also be better seen in FIG. 4.

Figure 5:
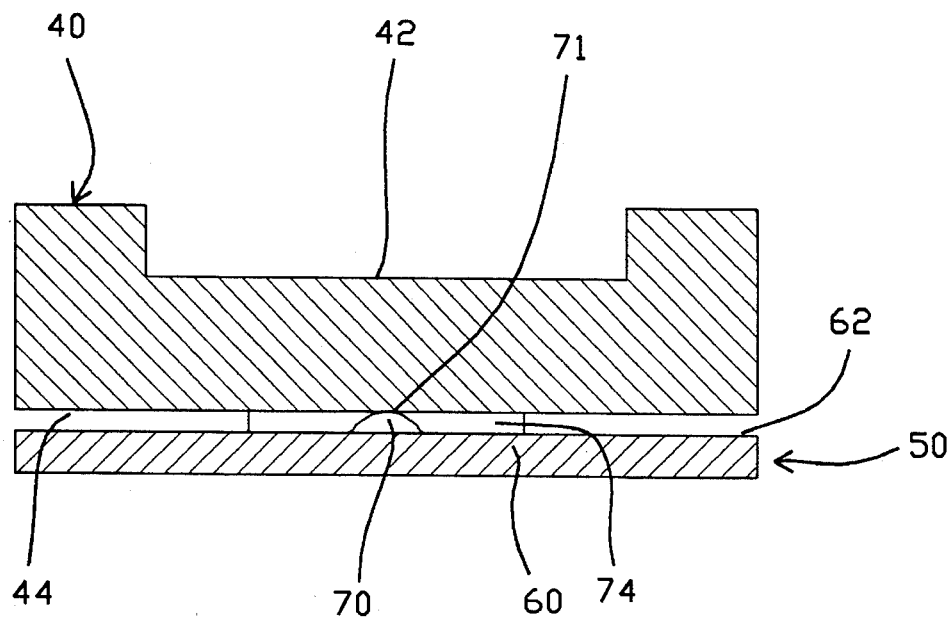
FIG. 5 is a cross-sectional view along line 5—5 of the gimbal assembly and head assembly of the head suspension assembly of FIG. 1.
Figure 6:
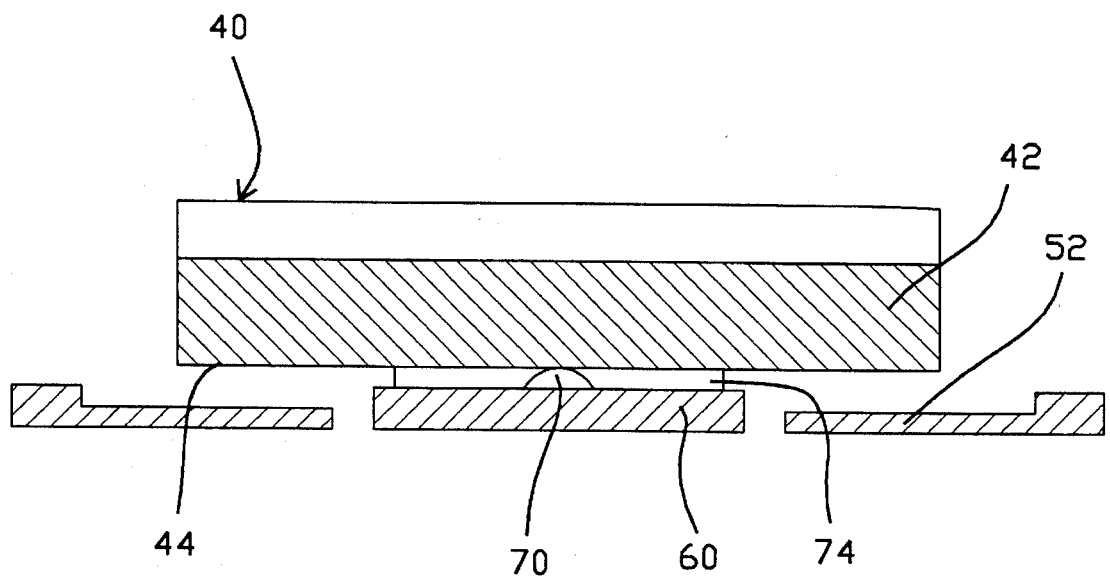
FIG. 6 is a cross-sectional view along line 6—6 of the gimbal assembly and head assembly of the head suspension assembly of FIG. 1.

FIG. 5 shows a cross-sectional view along line 5—5 of the gimbal assembly 50 and head assembly 40 of the HSA 20 shown in FIG. 1. FIG. 6 shows a cross-sectional view along line 6—6 of the same gimbal assembly 50 and head assembly 40. When positioning the head suspension assembly 20, a head bonding surface 44 of slider 42 is placed against apex 71 of the solidified static attitude adjustment feature 70. Static attitude adjustment feature 70 is hard enough to not be deformed by a gram load applied on the slider when the slider 42 is bonded to the gimbal assembly 50.

The static attitude adjustment feature 70 can provide a correct offset height, as well as compensate for the correct attitude angle. The solid drop has the correct offset Z-height profile to offer the necessary clearance for gimballing motion of the head assembly 40. Correct offset height is determined by measuring the Z-height of possible obstructions within radial reach of the head assembly 40, the maximum expected angle for gimballing motion, and the radial distance to the obstruction. Partially etching the spring arms 52, as those of the embodiment shown in FIG. 6, can provide additional clearance.

Figure 7:
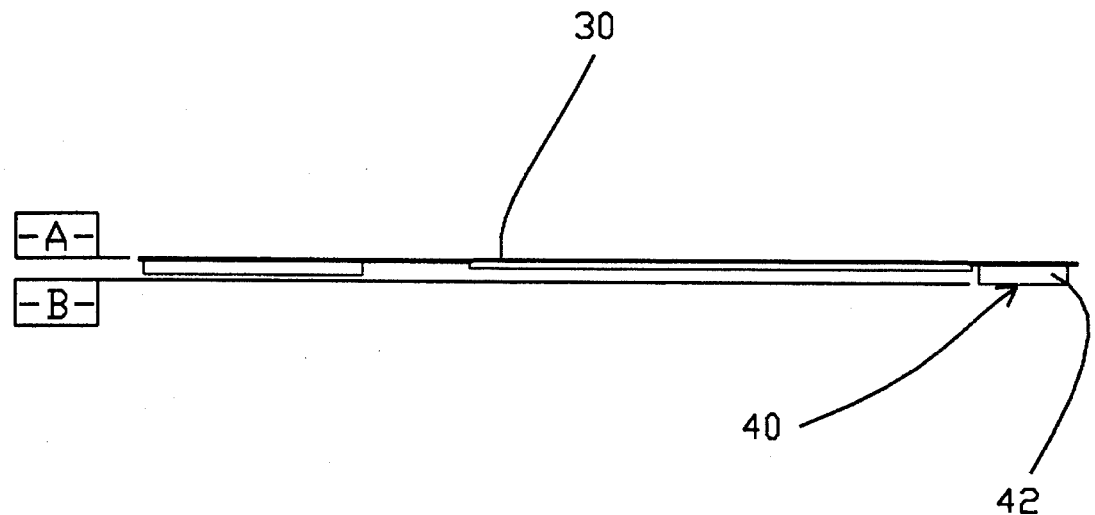
FIG. 7 is a side view of a load beam of the head suspension assembly of FIG. 1 positioned along surface datum plane -A- and of a slider of the head assembly positioned along surface datum plane -B- during head suspension assembly manufacturing.

To illustrate the process of head assembly positioning, FIG. 7 shows the suspension assembly (including load beam 30 and gimbal assembly 50) having a proximal end aligned on datum plane A while the slider 42 of head assembly 40 is aligned on datum plane B, which is at the desired static attitude angle with respect to datum plane A. The Z-height is controlled by the datum planes. With the slider 42 clamped into the datum plane B, the flexure platform 60 of the gimbal assembly 50 is placed at the correct X and Y location and a predetermined load point of the head bonding surface 44 (refer to FIGS. 5 and 6) is placed in contact with the apex 71 of the static attitude adjustment feature 70. The exposed attitude adjustment feature 70 offers a visual reference point for alignment of the head assembly 40.

Figure 8:
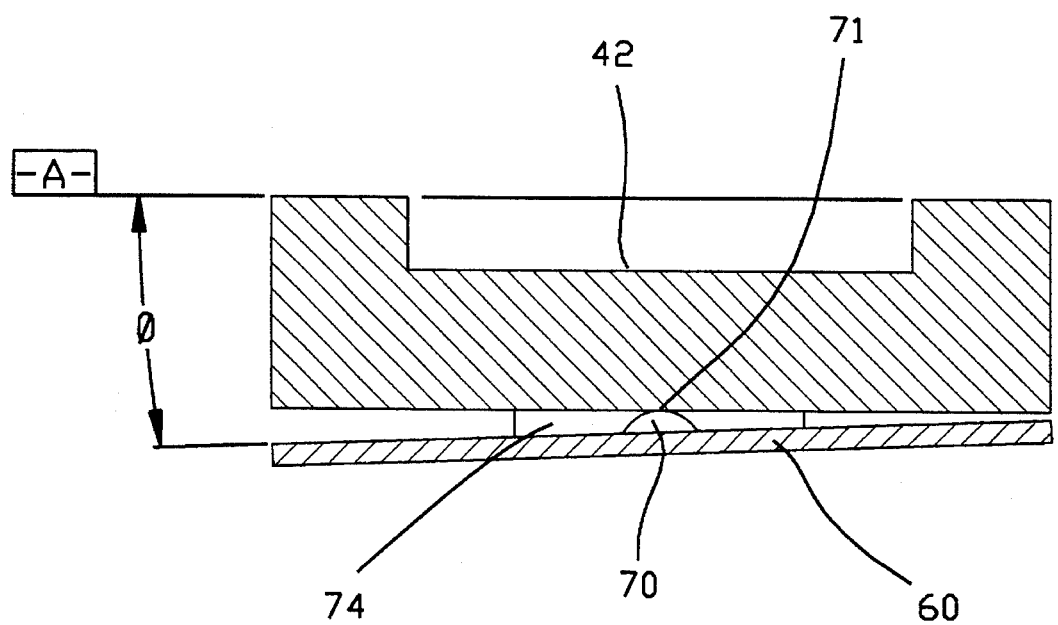
FIG. 8 is a cross-sectional view along line 5—5 of the gimbal assembly and head assembly of FIG. 1, illustrating the static attitude adjustment feature acting as a pivot point to compensate for a roll error to achieve the desired static attitude.

Using the apex 71 of adjustment feature 70 as a pivot point, the slider 42 is placed at the correct flying attitude. Adhesive 74 is dispense or injected through holes in the flexure platform 60. Adhesive 74 has the correct viscosity to wick and fill the interstitial space between the bonding surface 44 of slider 42 and the flexure platform 60. The slider 42 is bonded to the flexure platform 60 parallel to the datum plane B. The adhesive 74 bond line thickness varies to accommodate the static attitude error. FIG. 8 shows the slider 42 pivoting on the apex 71 of the static attitude adjustment feature 70 to correct a roll error angle phi between the flexure platform 60 and the slider 42. Slider 42 is pivoted on the apex of static attitude adjustment feature 70 until the correct flying attitude is achieved.

Adhesive 74 is applied in sufficient thickness to accommodate the static attitude adjustment feature 70 and bond line thickness variation. Adhesive 74 can be the same or have a similar thermal coefficient of expansion as the adhesive used for the solid drop of the static attitude adjustment feature 70 to insure an even bond line compliance.

Figure 9:
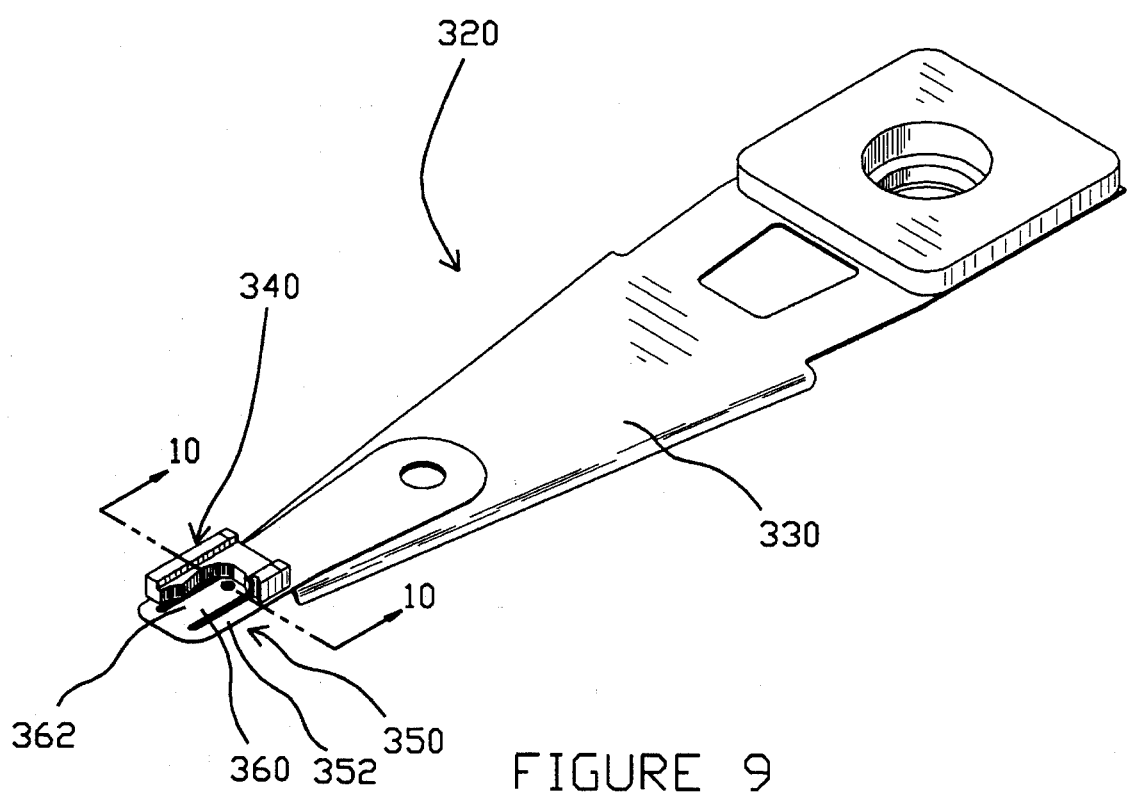
FIG. 9 is a perspective view of a fourth embodiment of a head suspension assembly in accordance with the present invention.

FIG. 9 shows another HSA embodiment 320 including a gimbal assembly 350 having a T-shaped flexure tongue/platform 360 supported by spring arms 352 and extending longitudinally from a distal end of a load beam 330. A head assembly 340 is bonded to a first surface 362 of the flexure platform 360. A second surface 364 of the flexure platform 360 is opposite a load cover 380 (both shown in FIG. 10A).

Figure 10A:
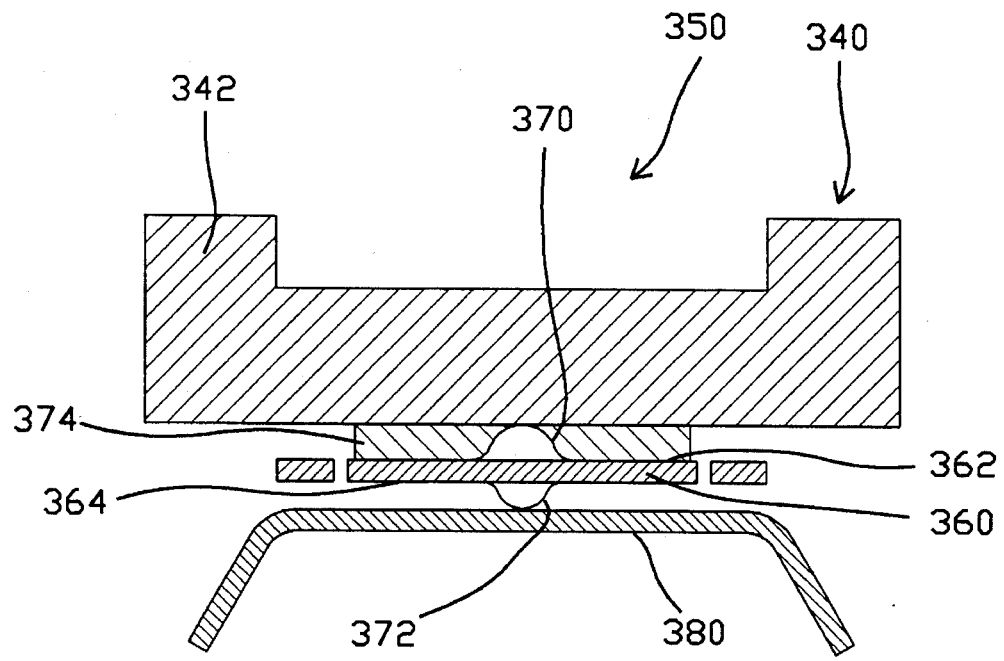
FIG. 10A is a cross-sectional view along line 10—10 of the gimbal assembly and head assembly of the embodiment of FIG. 9.

FIG. 10A shows a cross-sectional view along line 10—10 of the gimbal assembly 350 and the head assembly 40. In the present embodiment, in addition to a solid static attitude adjustment feature 370 projecting from a first surface 362 of a flexure platform 360, a load point feature 372 extends out of a second surface 364 of the flexure platform 360. Load point feature 372 applies a gram load generated by load cover 380. Both adjustment feature 370 and load point feature 372 comprise solid drops.

Figure 10B:
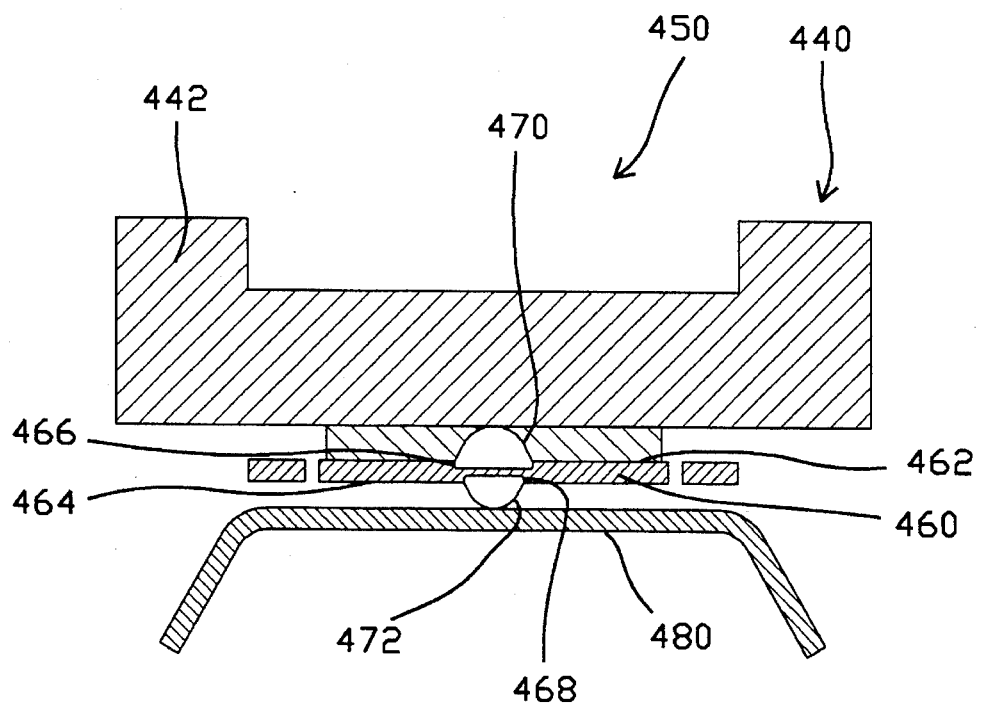
FIG. 10B is a cross-sectional view, along a line situated in a similar position as line 10—10, of a fifth head suspension assembly embodiment similar to the embodiment of FIG. 9.

FIG. 10B shows an embodiment of a gimbal assembly 450. The HSA embodiments including gimbal assembly 450 shown in FIG. 10B, gimbal assembly 550, shown in FIG. 10C, and gimbal assembly 650 shown in FIG. 11 are similar to the HSA 320 shown in FIGS. 9 and 12 with the exception of gimbal assembly features described below.

Gimbal assembly 450 includes a flexure platform 460 having a first cavity 466 on its first surface 462 and a second cavity 468 aligned directly opposite first cavity 466 on the second surface 464 of the flexure platform 460. Cavities 466 and 468 can be partially etched during the initial manufacture of the gimbal flexure platform 460, or can be etched later when adding the surface features. During manufacture, a drop of a solidifiable adhesive is placed on a first cavity 466. The drop solidifies into static attitude adjustment feature 470. A second drop of a suitable adhesive, not necessarily the same adhesive material as that of the first drop, is dispensed on second cavity 468 to form a load point feature 472. Once solidified the material used for load point feature 472 strongly adheres to the flexure platform 460. The material used for load point feature 472 has a low coefficient of friction and low wear abrasion. The material does not outgas or produce particles that can contaminate the drive. When cured, the load point feature 472 is hard enough to resist deformation upon application of a gram load and is not overly affected by temperature changes of up to 260° C. for several seconds (time and temperature needed to allow solder connections to head assembly 440).

Figure 10C:
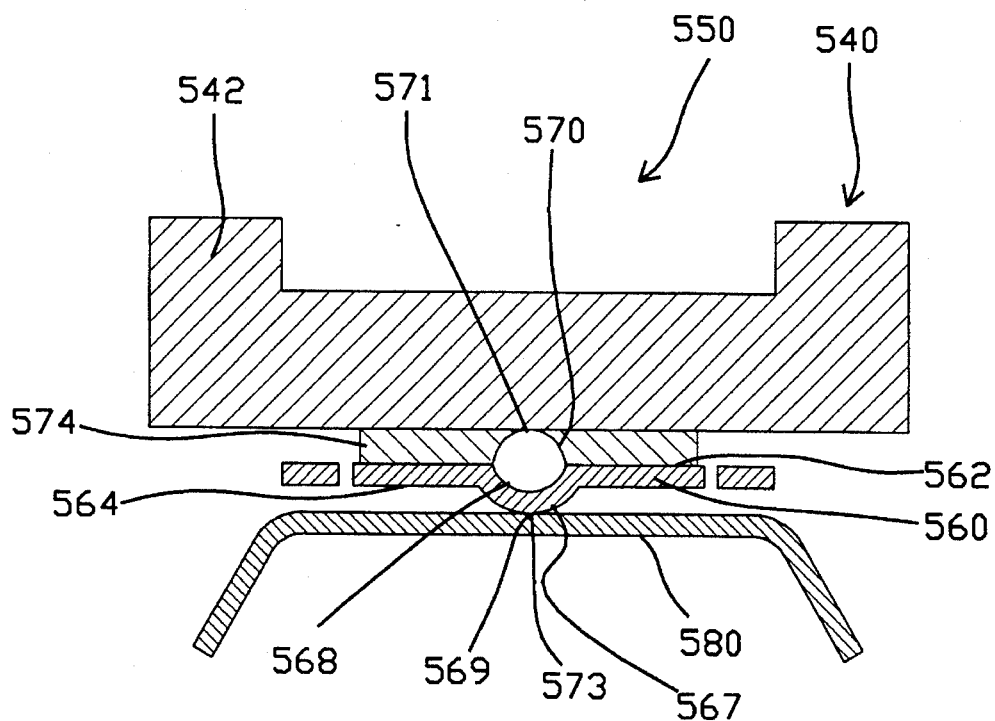
FIG. 10C is a cross-sectional view, along a line situated in a similar position as line 10—10, of a sixth head suspension assembly embodiment similar to the embodiment of FIG. 9.
Figure 11:
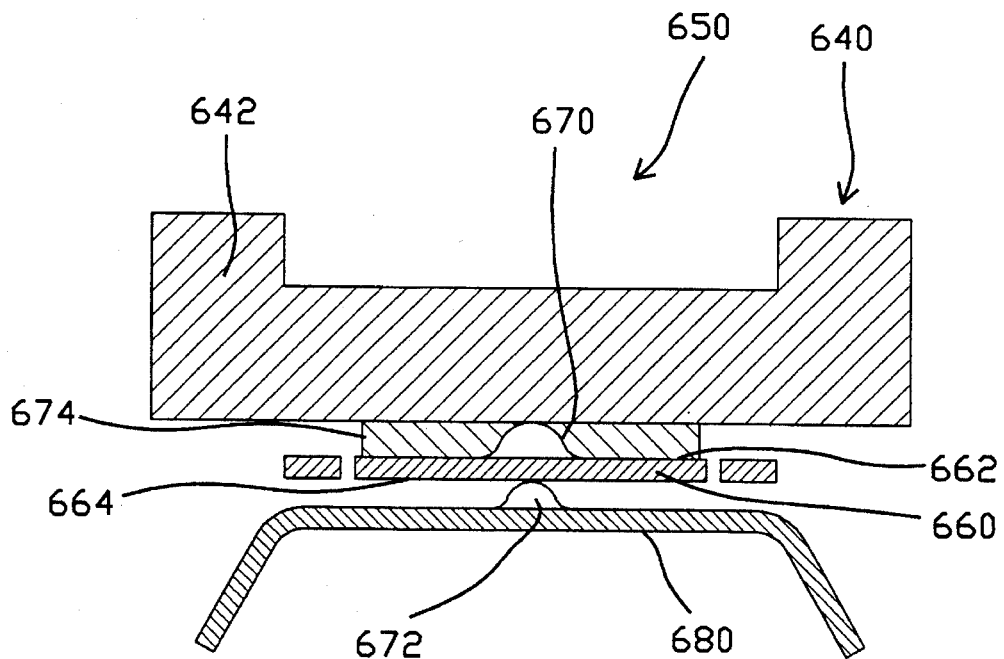
FIG. 11 is a cross-sectional view, along a line situated in a similar position as line 10—10, of a seventh head suspension assembly embodiment similar to the embodiment of FIG. 9.

FIG. 10C shows another embodiment of a gimbal assembly 550 including a formed dome 567 similar to the dome 267 shown in FIG. 3D. The dome 567 has a convexity 569 protruding from a second surface 564 of flexure platform 560 and a concavity 568 indenting the first surface 562 of the flexure platform 560. The convexity 569 acts as a load point feature through which the gram load is applied from cover 580. Convexity 569 has an apex 573.

During manufacturing, a drop of the fluid material is placed in concavity 568, allowed to settle and then cure. The surface tension of the fluid and gravity create a dome-shaped static attitude adjustment feature 570 having an apex 571 which is perfectly aligned to the apex 573 of the convexity 569 along the Z-axis. Gimbal assembly 550 offers extremely accurate Z-axis alignment between the load point feature convexity 569 and the static attitude adjustment feature solid drop 570.

FIG. 11 shows yet another embodiment of a gimbal assembly 650. Gimbal assembly 650 has a first solidified static attitude adjustment feature 670 rising from the first surface 662 of flexure platform 660. Adhesive layer 674 attaches the slider 642 at the correct static flying attitude to the flexure platform 660. A load cover 680 applies the necessary gram load pressure to the slider through a second solidified drop, a load point feature 672 arising out of the surface of the cover 680 facing the flexure platform 660. Both surface features 670 and 672 comprise solid drops adhesively connected to the flexure platform 660 and the load cover 680 respectively.

Figure 12:
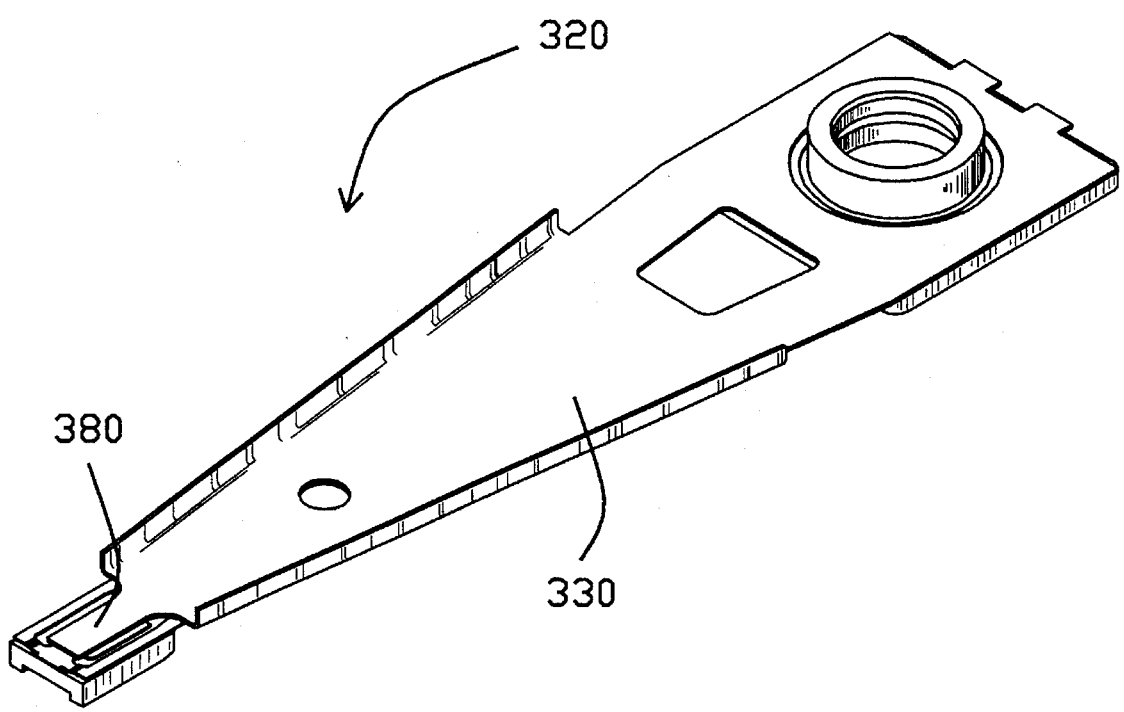
FIG. 12 is a perspective view of a second side of the head suspension assembly of FIG. 9.

FIG. 12 shows a second side of HSA 320. In the present embodiment, load cover 380 is an integral extension of load beam 330.

The present invention has significant advantages over those known in the prior art. The invention offers a simple cost-effective method to add surface features to both specifically designed and already manufactured traditional suspension assemblies. Placement of the solidifiable drop can be done with a high degree of accuracy, and without additional forming, stamping or etching steps that place stresses on the suspension assemblies. Even when some opposite forming is needed to accommodate the solidifiable drop, the solid drop static attitude adjustment technique allows more flexible manufacturing tolerances. Since the accuracy of a form is less critical, manufacturing tools can be used longer, past today's wear levels. Rounded form lines also yield lower stress fracture problems. Angular errors can be accommodated in slider bonding processes. Most pitch and roll error sources can be eliminated using the static attitude adjustment feature. In addition, the present invention also can minimize slider warp. Finally, the solid drop concept can eliminate gimbal offset forming.

The invention is not to be taken as limited to all of the details thereof as modifications and variations thereof may be made without departing from the spirit or scope of the invention.

What is claimed is:

1. A gimbal assembly of the type configured for attaching to a distal end of a suspension assembly for positioning a head assembly at a desired attitude with respect to a rotatable data storage device, the gimbal assembly comprising:
   a flexure platform comprising a head assembly-engaging first surface and an opposite-facing second surface, said flexure platform further having a raised static attitude adjustment feature protruding from and adhesively connected to the first surface, the static attitude adjustment feature comprising a solidified drop of an adhesive material, wherein the solid drop has an apex including a pivot point defining the intersection of static roll torque axis adjustment and static pitch torque axis adjustment for the head assembly.

2. The gimbal assembly of claim 1 wherein the static attitude adjustment feature comprises an adhesive fluid capable of forming a raised droplet in the fluid state.

3. The gimbal assembly of claim 1 wherein the static attitude adjustment feature includes electrically conductive material and is used for electrostatic grounding of the head assembly.

4. The gimbal assembly of claim 1 wherein the flexure platform further comprises an etched guide feature for positioning the static attitude adjustment feature.

5. The gimbal assembly of claim 1, further including a load cover comprising a load applying element longitudinally extending from a distal end of the suspension assembly, wherein the load cover is opposite to the second surface of the flexure platform, and wherein the load cover applies a gram load on the head assembly through the flexure platform.

6. The gimbal assembly of claim 5 wherein said flexure platform further includes a raised load point feature protruding from the second surface, said load point feature comprising a solid drop of material having an apex contiguous to the load cover, wherein the load cover applies the gram load to the apex of the load point feature.

7. The gimbal assembly of claim 5 wherein the flexure platform further comprises a formed dome having a convexity protruding from the second surface and a concavity indenting the first surface, wherein the convexity is a load point feature and has an apex contiguous to the load cover and the load cover applies the gram load to the apex, and wherein the attitude adjustment feature is positioned at least partially inside of the concavity.

8. The gimbal assembly of claim 5 wherein said load cover includes a raised load point feature extending towards and in contact with the flexure platform, wherein the apex of the load point feature applies the gram load to the flexure platform.

9. The gimbal assembly of claim 8 wherein the load point feature comprises a solid drop of material.

10. The gimbal assembly of claim 9 wherein the solid drop is adhesively connected to the load cover.

11. The gimbal assembly of claim 9 wherein the solid drop includes a solidified adhesive fluid.

12. A gimbal assembly located at a distal end of a suspension assembly for positioning a head assembly at a desired attitude with respect to a rotatable data storage device, the gimbal assembly comprising:

a flexure platform comprising a head assembly-engaging first surface and an opposite-facing second surface, the platform having a raised load point feature protruding from and adhesively connected to the second surface, the load point feature comprising a solidified drop of an adhesive material having an apex; and a load cover comprising a load applying element longitudinally extending from a distal end of the suspension assembly, wherein the load cover is opposite to the second surface of the flexure platform, and wherein the load cover applies a gram load on the apex of the solid drop of material.

13. A gimbal-head assembly of the type configured for attaching to a disk drive, the gimbal-head assembly comprising:

a flexure platform comprising a head assembly-engaging first surface and an opposite-facing second surface, said flexure platform further having a raised static attitude adjustment feature protruding from and adhesively connected to the first surface, the static attitude adjustment feature comprising a solidified drop of an adhesive material, wherein the solid drop has an apex including a pivot point defining the intersection of static roll torque axis adjustment and static pitch torque axis adjustment for the head assembly;

a head assembly having an air-bearing slider and a transducer;

a layer of adhesive, wherein the slider is placed against the static attitude adjustment feature and pivoted to a desired static attitude, and wherein the layer of adhesive is for attaching the slider to the first surface of the flexure platform at the desired static attitude.

14. A head suspension assembly for supporting a head assembly at a predetermined attitude over a rotating data storage device, the head suspension assembly comprising:

a load beam defining a longitudinal axis and including an elongated spring structure;

a head assembly including a read/write transducer and an air-bearing slider;

a gimbal assembly for providing gimballing support to the head assembly, the gimbal assembly engaged to a distal end of the load beam and including a flexure platform supported by spring arms, the flexure platform including a head assembly-engaging first surface and an opposite facing second surface, the platform further having a raised static attitude adjustment feature protruding from and adhesively connected to the first surface, the static attitude adjustment feature comprising a solidified drop of an adhesive material having an apex, wherein the apex is a pivot point defining the intersection of static roll torque axis adjustment and static pitch torque axis adjustment for the head assembly; and a layer of adhesive for attaching the slider to the first surface of the flexure platform, wherein the attitude adjustment feature contacts the slider and the slider pivots on the pivot point of the attitude adjustment feature along the pitch and the roll axis to achieve the desired static attitude, and wherein the adhesive holds the slider at the desired static attitude.

15. The head assembly of claim 14 wherein the static attitude adjustment feature has a correct offset height sufficient to allow gimballing motion by the head assembly.

16. A method of manufacture for a gimbal assembly for providing gimballing motion to a head assembly and for supporting the head assembly at a predetermined attitude with respect to the surface of a rotatable data storage device, the method comprising the steps of:

providing a planar flexure platform, the flexure platform including a head assembly-engaging first surface and an opposite facing second surface;

placing on the first surface a drop of a solidifiable fluid having the sufficient viscosity and surface tension to create a raised droplet;

curing the drop of fluid into a solid which adheres to the first surface, thereby creating a static attitude adjustment feature having an apex including a pivot point defining the intersection of static roll torque axis adjustment and static pitch torque axis adjustment for the head assembly.

17. The method of manufacture of claim 16, further comprising the step of forming a dimple having a concavity on the first surface and a convexity on the second surface, wherein the solidifiable drop of fluid is placed in the concavity of the first surface, and wherein the pivot point of the static attitude adjustment feature is aligned with the apex of the convexity along a vertical axis perpendicular to the first surface of the flexure platform.

18. The method of manufacture of claim 16, further comprising the step of placing a second drop of a solidifiable fluid having the sufficient viscosity and surface tension to create a raised droplet on the second surface and the step of curing the second drop into a solid which adheres to the second surface, thereby creating a load point feature having an apex aligned with the load point of the static attitude adjustment feature along a vertical axis perpendicular to the first surface of the flexure platform.

19. The method of manufacture of claim 16, further comprising the step of manufacturing a guide feature on the first surface of the flexure platform, wherein the drop of the solidifiable fluid is placed on the guide feature and wherein the guide feature helps define and hold the position of the solidifiable fluid.

20. The method of manufacture of claim 19 wherein the step of manufacturing the guide feature includes etching a partial cavity for receiving the drop of the solidifiable fluid.

21. A method of manufacture for a head suspension assembly for supporting a head assembly at a predetermined attitude with respect to the surface of a rotatable data storage device, the method comprising the steps of:

providing a suspension assembly having a load beam and a gimbal, the load beam comprising an elongated spring structure positioned along a longitudinal axis and on a first datum plane, the gimbal assembly located at a distal end of the load beam, the gimbal assembly including a planar flexure platform supported by spring arms, the flexure platform including a head assembly-engaging first surface and an opposite facing second surface, the first surface having a predetermined pivot point;

placing on the first surface of the flexure platform a drop of a solidifiable fluid having the sufficient viscosity and surface tension to create a raised droplet;

curing the drop of fluid into a solid which adheres to the first surface of the flexure platform, thereby creating a static attitude adjustment feature having an apex including a pivot point defining the intersection of static roll torque axis adjustment and static pitch torque axis adjustment for the head assembly;

providing a head assembly including a read-write transducer and an air bearing slider;

placing the head assembly along a second datum plane parallel to the first, the slider of the head assembly having a head bonding surface;

positioning the head bonding surface of the slider against the static attitude adjustment feature;

using the pivot point of the adjustment feature as a pivot interface for making pitch axis adjustments and roll axis adjustments for eliminating adverse pitch and roll torques resulting from pitch and roll static errors;

placing the head assembly in a correct static attitude;

adhesively bonding the head assembly to the flexure platform in the correct static attitude.

22. The method of manufacture of claim 21 wherein the head bonding surface of the slider has a predetermined load point and the step of positioning the head bonding surface of the slider against the static attitude adjustment feature comprises the step of visually aligning the load point and the apex of the static attitude adjustment feature against each other.

* * * * *